Aug. 26, 1969 C. R. CORSON 3,463,880

HALFTONE IMAGE GENERATOR SYSTEM

Filed March 21, 1966 2 Sheets-Sheet 1

INVENTOR.
CARL R. CORSON
BY
John T. O'Halloran
Attorney

INVENTOR.
CARL R. CORSON
BY
John T. O'Halloran
Attorney

United States Patent Office
3,463,880
Patented Aug. 26, 1969

3,463,880
HALFTONE IMAGE GENERATOR SYSTEM

Carl R. Corson, Trenton, N.J., assignor to Radio Corporation of America, a corporation of Delaware Filed Mar. 21, 1966, Ser. No. 535,884
Int. Cl. H04n 5/38
U.S. Cl. 178—7.2 9 Claims

ABSTRACT OF THE DISCLOSURE

A halftone image generator generates a halftone image that simulates an original picture having a continuous tone image thereon. The halftone image generator includes an imaging device having a surface and scanning means for scanning the surface to create a plurality of halftone dots for forming images on the surface. The original picture is initially scanned to provide a plurality of analog image signals corresponding to the tones of the continuous tone picture. The analog image signals are digitized and stored in the memory in the form of digital signals. The memory is read and the digitized signals are converted back into analog signals which are applied to the scanning means of the imaging device to control the size of the halftone dots in accordance with the tones on the original picture.

The printing processes commonly used in the graphic arts industry, i.e. newspaper and book publishing, etc., deposit a uniform density of ink on paper whenever it is desired to print all or a portion of an image and deposit no link when the absence of an image is desired. This all-or-nothing process poses no problems when alphabetic and other characters are to be printed. However, when pictures, such as photographs, are to be printed, the problem of reproducing the continuous tones (i.e. light gradations) rises. This problem is solved by transforming the continuous tones of the original image into a halftone image that is composed of a large number of inked dots of various sizes. When the largest dots and the white paper between the dots are made small compared with the visual acuity of the eye, the dots and the paper between the dots fuse visually and trick the eye into believing it is seeing continuous tones. The term "halftone image" as used in the specification means an image that is composed of only black and white elements of various sizes.

To convert the production of newspapers, books, etc., into an automated process under the control of a computer, it is necessary that continuous tone pictures be automatically converted into halftone images so that the standard printing presses may be utilized to reproduce these pictures. Such an automatic process significantly decreases the time required for the preparation of printing page formats and adds the capability of doing so inexpensively when a large number of different page formats are needed.

Accordingly, it is an object of this invention to provide a new and improved generator for producing halftone images.

It is another object of this invention to provide an electronic halftone image generator system.

A halftone image generator embodying the invention electronically generates a halftone image corresponding to an original picture having a continuous tone image thereon. The halftone image generator includes an imaging device having a surface for imaging data thereon. Scanning means for scanning the surface of the imaging device is provided to form the data on the imaging device. The scanning means is deflected into a plurality of discrete spiral scans to display a plurality of dots on the imaging device. A plurality of signals each one corresponding to a tone on separate portions of said continuous tone picture are applied to control the size of said dots to produce dots of differening sizes depending upon the corresponding tone on the original picture. The plurality of signals may be derived from a memory of previously stored signals or directly from the original continuous tone picture.

Figure 1:
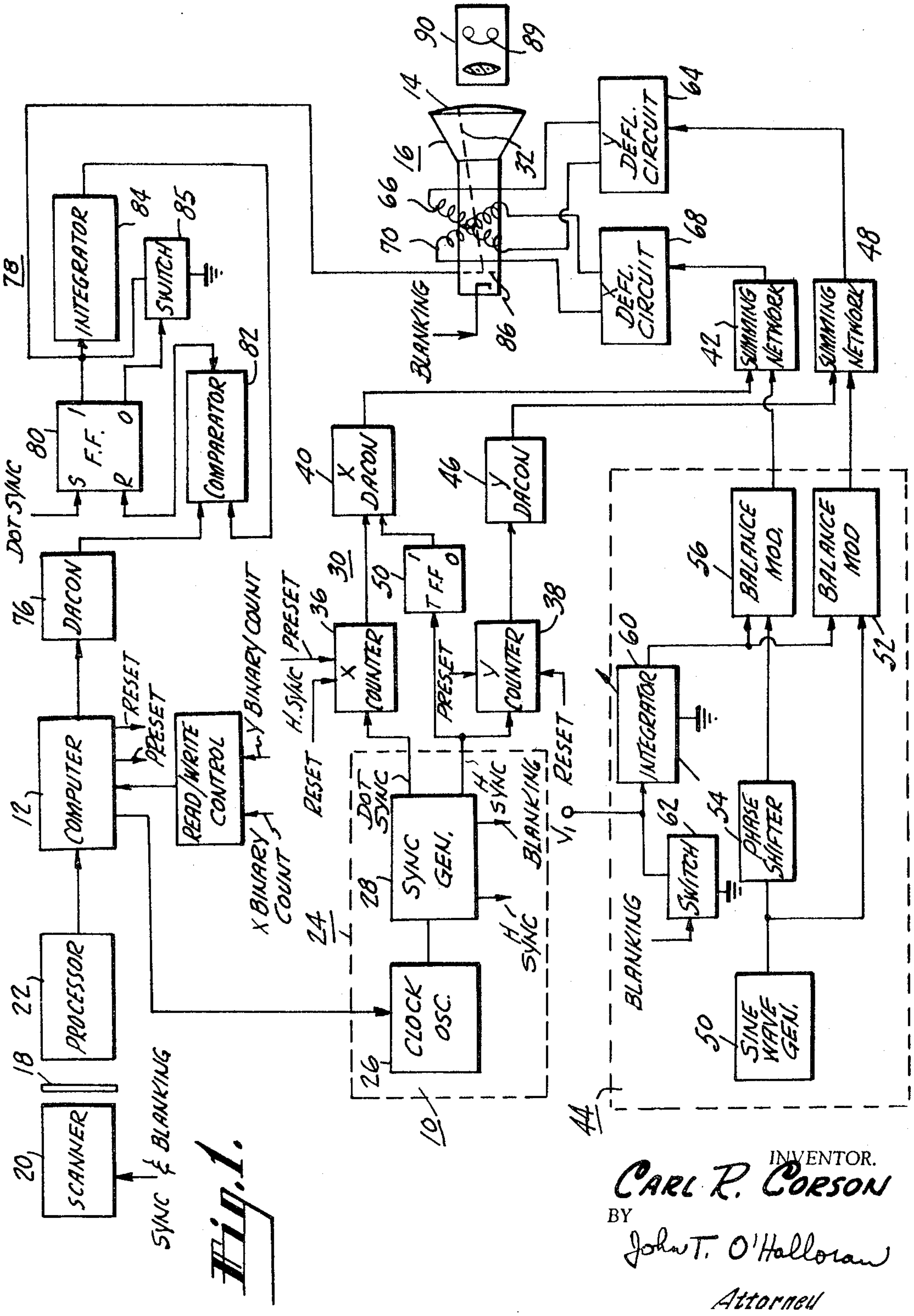
FIGURE 1 is a schematic block diagram of an electronic halftone image generator system embodying the invention.

Referring now to FIGURE 1, an electronic halftone image generator system 10 converts binary signals stored in the memory of a computer 12 into halftone images for imaging on the face 14 of an imaging device 16. Each binary signal may, for example, correspond to a tone (i.e. light gradation) on a portion of an original picture 18. The original picture 18 may be scanned by a scanner 20 to derive analog image signals corresponding to the tones on the various portions of the picture. The analog image signals are processed and converted to binary coded signals by a processor 22. The processor 22 may, for example, include a photoelectric transducer for converting optical (light) image signals into analog electronic signals and an analog-to-digital converter for converting the analog signals into binary coded message signals for storage in the memory of the computer 12.

Figure 2:
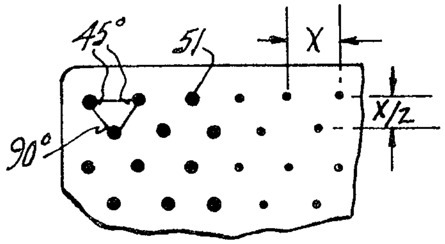
FIGURE 2 is a fragment of a scanning raster illustrating a portion of the typewriter scanning pattern utilized in the system of FIGURE 1.

The original scanning of the scanner 20 as well as the imaging of the data on the imaging device 16 in the electronic halftone image generator system 10 is controlled by a master timing control circuit 24. The iming control circuit 24 includes a master clock oscillator 26 that produces a plurality of timing signals. The timing signals generated in the oscillator 26 are applied to a synchronizing signal generator 28. The synchronizing signal generator 28 produces dot synchronizing signals as well as horizontal or line synchronizing signals. The generator 28 also generates dot and horizontal or line blanking pulses. The synchronizing and blanking pulses are applied to a deflection control circuit 30 that controls the scanning pattern of the scanning beam 32 in the imaging device 16 as well as the scanning pattern of the scanner 20. The imaging device 16 may, for example, comprise a cathode ray tube. Each scanline in the scanning patterns produced by the deflection control circuit 30 comprises a plurality of dots resembling a line of periods as produced by a typewriter such as shown in FIGURE 2. Such a "typewriter scanning pattern" differs from the usual continuous type scanning pattern by the fact that the deflection control circuit 30 stops the scanning beam 32 during each scanline at a plurality of positions. The scanning means remains at each position for a predetermined time and then is jumped to the next successive position with the beam 32 blanked during each jump. The sync generator 28 therefore produces a plurality of dot synchronizing pulses during each scanline as well as a plurality of dot blanking pulses to blank the display device 16 as the scanning means are moved to new typewriter scan positions at each dot sync pulse. At the end of each scanline, the sync generator 28 produces a line or horizontal sync pulse to retrace the scanning beam 32 to the beginning of the next scanline as well as a horizontal blanking pulse to blank the beam 32 during horizontal retrace.

The deflection control circuit 30 includes a horizontal or "X" counter 36 and a vertical or "Y" counter 38. The horizontal counter 36 is coupled to the sync generator 28 to count the dot synchronizing pulses generated therein. The counter 36 is reset at the end of every scanline by a horizontal or line sync pulse applied thereto from the sync generator 28. The vertical counter 38 is coupled to the sync generator 28 to count the horizontal synchronizing pulses. The counter 38 is reset by a reset pulse applied from the computer 12 at the end of imaging a halftone image on the device 16. A halftone image is normally imaged onto the device 16 once and the halftone image may be located at any random position on the device 16. The X and Y counters 36 and 38 are preset by preset signals from the computer 12 at the beginning of the binary coded massage signals to establish the location of the halftone image to be displayed on the device 16 as well as the margins of the image displayed.

The signal output count in the counter 36 is converted to an analog voltage by an X digital-to-analog converter (DACON) 40 coupled thereto. This horizontal analog voltage is applied to a summing network 42 where it is summed with the output of a spiral scan generator 44. Similarly, the binary signal output count in the counter 38 is converted to an analog voltage in a Y digital-to-analog converter (DACON) 46. This vertical analog voltage is applied to a summing network 48 where it is summed with the output of the spiral scan generator 44. A triggerable flip-flop 50 has its trigger terminal T coupled to the sync generator 28 to the alternately set and reset by the horizontal sync pulses generated in the generator 28. The "1" output terminal of the flip-flop is coupled to the X DACON 40 to change the output of this DACON at every other scanline. Such a change displaces the scanning dots 51 in every other scanline by one-half of the dot-to-dot spacing, as shown in FIGURE 2. This displacement simulates the 45° displacement that occurs in the typical printing of a halftone image from a Ronchi screen when the scanning rows are spaced apart a distance equal to one-half the spacing between horizontal dots. The dots 51 are shown in FIGURE 2 as being black dots on a white background whereas in fact the dots on the face 14 of the display device 16 are light and the background is darker.

Figure 3:
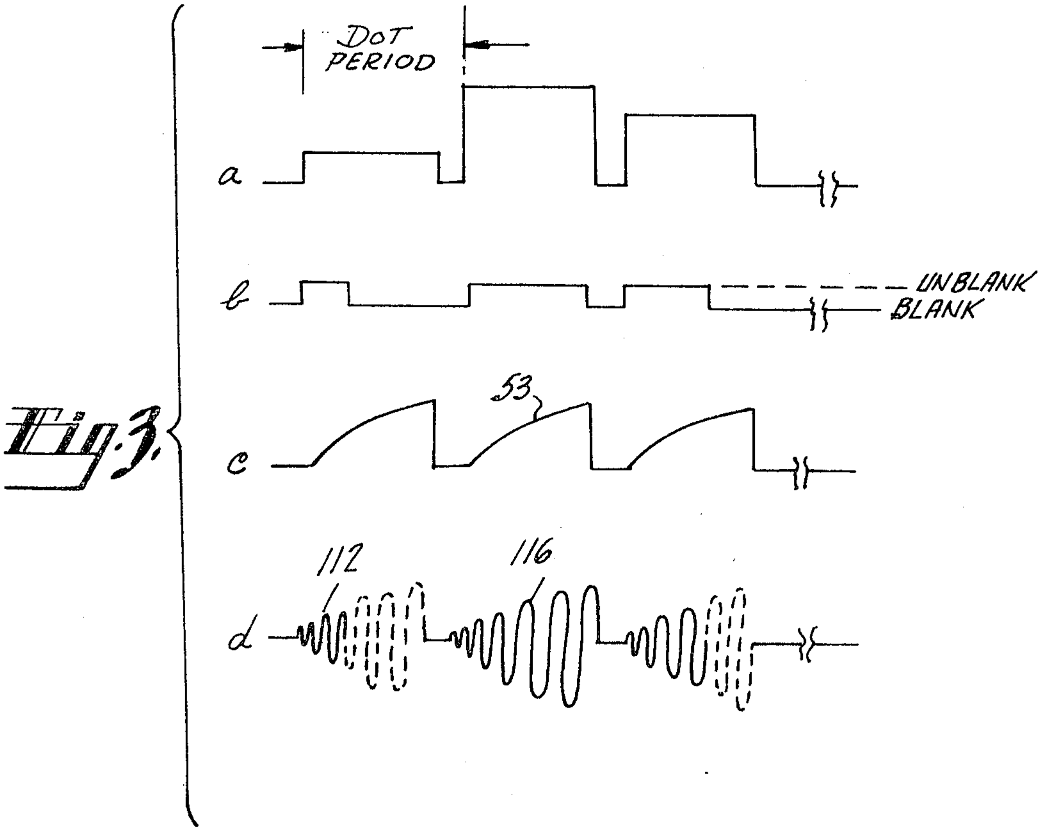
FIGURE 3 is a graph illustrating the waveforms that occur at a plurality of locations in the system of FIGURE 1.

The spiral scan generator 44 produces a plurality of halftone image dots on the face 14 of the display device 16. A halftone image dot is formed by producing a spiral scan in the electron beam 32. The spiral scan generator 44 includes a sinewave generator 50 that generates and applies a sinewave directly to a first balanced modulator 52. The sinewave generator 50 also applies a sinewave to a phase shifter 54 which shifts the sinewave 90° to convert it into a cosine wave. The cosine wave from the phase shifter 54 is applied to a second balanced modulator 56. The other input to each of the first and second balanced modulators 52 and 56 comprises a modulating wave derived from a variable integrator 60. The integrator 60 may, for example, comprise a resistive-capacitive circuit that is adjustable to control the time constant of charge of the RC charge path. The integrator 60 is coupled to a power supply to charge toward a voltage $V_1$. The integrator 60 is discharged to circuit ground by an electronic switch 62 coupled thereacross. The electronic switch 62 which may, for example comprise a transistor switch, is closed to discharge the integrator 60 at the end of each dot period as well as at the end of each scanline by applying dot and line blanking pulses thereto. A typical integrator 60 output is shown by the wave 53 in line *c* of FIGURE 3. The integrator 60 is made variable so that the shape of the substantially sawtooth waves may be varied. The sinewave in the modulator 52 is modulated by the output from the integrator to provide an exponentially increasing sinewave as shown by the line *d* in FIGURE 3. The balanced modulator 56 produces a similarly increasing cosine wave. The first balance modulator 52 is coupled to the first summing network 48 along with the output voltage produced by the Y DACON 46 in the deflection control circuit 30. The voltage derived from the DACON 40 effectively supplies a baseline bias to position the scanning beam 32 in the display device 16. The added exponentially increasing sinewave alternates the voltage about this baseline. The output of the summing networks 48 is applied to a Y deflection circuit 64 that converts this output voltage into a deflection current for application to the vertical deflection coil 66 in the display device 16. Similarly, the second balanced modulator 56 along with the output of the X DACON 40 are applied to the second summing network 42 to produce an exponentially increasing cosine wave having a baseline bias included therein. The output of the second summing network 42 is applied to an X deflection circuit 68 that converts the increasing voltage output of the summing network 42 into a deflection current for application to a horizontal deflection coil 70 in the display device 16.

The computer 12 is coupled to the clock oscillator 26 to start the imaging process when programmed to do so. The counters 36 and 38 are coupled to a read/write control circuit 74 to read the memory of the computer in sequence and thus avoid storing the X–Y coordinates of the data in the computer 12. The binary coded signals are read from the computer 12 into a digital-to-analog converter 76 and the analog output voltage of the DACON 76 is applied to a pulse width modulator 78. The modulator 78 converts the varying analog output signals into pulses of uniform amplitude but varying widths. The modulator 78 includes a flip-flop 80 having set (S) and reset (R) input terminals and corresponding 1 and 0 output terminals. A dot synchronizing pulse from the sync generator 28 is coupled to the set terminal of the flip-flop 80. The output of the DACON 76 is applied as one input to a comparator 82. The output of the comparator 82 is coupled to the reset terminal R of the flip-flop 80. The "1" output terminal of the flip-flop 80 is coupled to an integrator 84 as well as to the grid 86 of the display device 16. The output of the integrator 84 is applied as the other input to the comparator 82. An electronic switch 85 that may, for example comprise a transistor switch, is coupled to discharge the integrator 84 to signal ground when the switch 85 is closed by a signal from the "0" output terminal of the flip-flop 80 when reset. The halftone image imaged on the face 14 of the imaging device 16 may be photographed on film 89 by a camera 90. Alternatively, the halftone image formed by the electron beam 32 may be directly recorded by electron beam recording techniques.

In operation, the continuous tone image on the original picture 18 is converted into a screened halftone image that is displayed on the display device 16 and photographed by the camera 90. The original picture 18 may, for example, be a negative transparency wherein a dark tone represents lightness in the original scene or person photographed and a light tone represents darkness therein. The computer 12 initiates the timing circuit 24 and the deflection control circuit 30 to start the scanner 20 scanning the photograph 18. Light from the scanner 20 penetrates through a light tone on the photograph 18 to produce a large amplitude optical image signal and through a dark tone to produce a small amplitude image signal. The scanning may, for example, begin at the upper lefthand corner of the picture 18 and proceed in a typewriter scan pattern to the upper righthand corner of the photograph 18 under the control of the count in the counter 36 and the output of the X DACON 40. At the end of the first scanline, a horizontal or line sync pulse resets the X counter 36 to retrace back to the left side of the scanner 20. The line sync pulse is counted in the Y counter 38 to provide an output from the Y DACON 46 that positions the scanner 20 on the second scanline. Thus, orthogonal scanning is performed. However, it is to be noted that the picture 18 may be scanned randomly if desired. Additionally, the picture 18 need not be a transparency inasmuch as an opaque print may also reflect optical signals in differing amplitudes to reproduce the tones thereon. Line sync pulses also set and reset the triggerable flip-flop 50 to supply an additional voltage to the X DACON 40. The scanning pattern of the second and every other scanline is therefore displaced so that a dot begins one scanline below but midway between the first two dots in the top scanline.

The plurality of optical image signals of varying amplitudes corresponding to the tones on the picture 18 are converted to analog electronic image signals in the processor 22. The plurality of electronic analog image signals are also converted to digital or binary coded signals in the processor 20 and stored in the memory of the computer 12 under the control of the control circuits 74. Each binary coded signal in the computer 12 corresponds to a tone on separate portions of the picture 18. Other text matter such as the alphabetic material contained in a newspaper advertisement that also contains a picture may be read into the computer. It is also to be noted that signals corresponding, for example to a cartoon sketch, may be directly read into the computer 12 without any scanning process of an original picture if desired.

The computer 12 initiates the readout of the binary signals stored in the memory. At this time the scanner 20 may be disconnected from the system 10. The scanning beam 32 is initially positioned in accordance with the preset signals in the X and Y counters 36 and 38. The generation of the dot synchronizing pulses and the dot blanking pulses causes the scanning beam 32 to be moved across the display device 16 producing the typewriter scan pattern shown in FIGURE 2. Each dot position is determined by the count in the counters 36 and 38.

The binary coded signals are read in sequence from the computer 12 and converted into a plurality of analog electronic image signals in the DACON 76. Each image signal has an amplitude that varies as a function of the original tone on the picture 18. The electronic image signals from the DACON 76 are shown in line *a* of FIGURE 2. Each dot sync pulse at the beginning of each electronic image signal sets the flip-flop 80 to provide an output from the "1" output terminal thereof. This output is integrated in the integrator 84 as well as applied to the grid 86 to provide an unblank signal for the display device 16. The integrator 84 integrates the output of the flip-flop 80 and applies a rising signal to the comparator 82. When the integrator signal equals the analog image signal from the DACON 76, the comparator resets the flip-flop 80. The output from the "0" output terminal of the flip-flop 80 closes the switch 85 to discharge to signal ground the integrator 84. The low output from the "1" output terminal of the flip-flop 80 blanks the display device 16. The output from flip-flop 80 is therefore a pulse width modulated version of the optical image signals derived from the picture 18. Such a signal is shown in line *b* of FIGURE 2. The greater the width of the pulse, the lighter the tone on the original picture 18.

Figure 4:
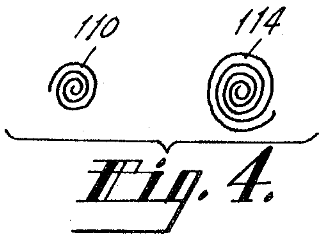
FIGURE 4 illustrates the generation of the different sizes of the halftone image dots.

The blanking and unblanking of the display device 16 determines the size of the halftone image dots produced on the face 14 of the device 16. The halftone image dots are produced in the spiral scan generator 44 by the integrator 60 charging along an essentially decreasing slope sawtooth charge path as shown in line *c* of FIGURE 2. The sine and cosine waves applied to the modulators 52 and 56 are modulated by the charging curves from the integrator 60 to produce exponentially increasing sine and cosine deflection waveforms. The summing networks 42 and 48 add the deflection bias generated in the control circuit 30 to position the scanning beam 32 in the display device 16 in the desired major location. The application of the exponentially increasing sine and cosine waves to the X and Y deflection coils of the display device 16 causes Lissajous patterns to be formed around the major location of the face 14 thereof. The Lissajous pattern created by a sine wave and a cosine wave is a circle. Increasing sine and cosine waves cause an increasing circle or a spiral scan to appear on the face 14 of the display device 16. The spiral scan grows as long as the display device 16 is unblanked. The portion of the spiral scans that are unblanked are shown solid in line *c* of FIGURE 3. The portions that are blanked and hence do not appear on the face 14 of the device 16 are shown dotted. The smaller spiral 110 in FIGURE 4 is created by a modulated wave such as the wave 112 in line *d* of FIGURE 2 whereas the larger spiral 114 in FIGURE 4 may be created by the wave 116 in FIGURE 3. The slope of the integrator 60 modulating wave and the frequency of the sine wave from the generator 50 are selected to cause the spiral scan lines to overlap producing solid dots. A substantially sawtooth modulating wave of decreasing slope is desired from the integrator 60. If a linearly increasing modulating wave is utilized, the linear velocity of the electron beam 32 would increase as the spiral grew. Higher linear velocities would result in unequal exposure times resulting in inaccurate halftone image dots. A sawtooth wave merges the outer scans of the spirals onto each other. The dots are small when the tones on the negative transparency picture are dark so that a negative halftone image of the original scene from which the picture 18 is derived is reproduced on the face 14 of the device 16. Such a negative halftone image produces a positive halftone image when photographed by the camera 90. When a negative halftone image is photographed by the camera 90, the image on the resulting film can be photoetched to produce a halftone printing plate directly therefrom.

It is to be noted that the halftone image dots may also be formed by changing the focus of the electron beam 32 in the imaging device 16 in accordance with the tones of an original scene. A defocused beam 32 produces a bigger dot than a focused beam.

The preferred formation of the halftone image dots is by spiral scans because the dot edges or peripheries are of a consistent sharpness regardless of the sizes of the dots. The dots themselves are of a constant intensity and substantially insensitive to cathode ray tube spot growth. Digitized video signals obviate the need for the gamma correction normally required with analog video signals and reduces the operation merely to an on-off process simplifying circuit design. The displaced typewriter scan pattern simulating the 45° Ronchi mechanical screens is readily obtainable in the system 10. Also high gamma film is not required to provide halftone dots with sharp black to white edge transitions.

Thus, an electronic halftone image generator system is provided wherein halftone images are created by spirally scanning an imaging device to produce halftone image dots and modulating the scans by a plurality of signals to determine the size of the halftone dots.

What is claimed is:

1. An electronic halftone image generator system for generating a halftone image corresponding to an original picture having a continuous tone image thereon, comprising in combination, means providing a plurality of electronic image signals, each having a characteristic related to the tone on a portion of said continuous tone picture, an imaging device having a scanning beam, means coupled to said imaging device for deflecting said scanning beam in a plurality of discrete spiral scans to provide a plurality of halftone dots, and means for applying said plurality of electronic image signals to said device to control the size of said dots to produce halftone dots from said spiral scans that correspond to the tones on said original picture.

2. An electronic halftone image generator system for producing a halftone image to simulate a continuous tone image, comprsing in combination, a scanner for scanning said continuous tone image to produce a plurality of image signals related to the tones on said continuous tone image, digitizing means coupled to said scanner for converting said plurality of image signals into a corresponding plurality of binary coded signals,
storage means coupled to said digitizing means for storing said binary coded signals,
an imaging device having a face for displaying images,
scanning means coupled to create images on said face, and
means for coupling said storage means to operate said scanning means to produce a plurality of halftone image dots of different sizes on said face, with the sizes of said halftone dots corresponding to the values of said binary coded signals.

3. An electronic halftone generator in accordance with claim 1 wherein said imaging device comprises
a cathode ray tube having a scanning beam.

4. An electronic halftone generator in accordance with claim 3 that further comprises
a deflection control circuit coupled to said cathode ray tube for deflecting said scanning beam in a typewriter scan pattern.

5. An electronic halftone generator comprising in combination
a cathode ray tube having a scanning beam,
a deflection control circuit coupled to said cathode ray tube for deflecting said scanning beam in a typewriter scan pattern,
a spiral scan generator coupled to said cathode ray tube for providing a plurality of spiral scans to produce a plurality of halftone dots,
said spiral scan generator including
first and second modulators,
means for applying a sine wave to said first modulator and a cosine wave to said second modulator,
an exponential wave generator coupled to said first and second modulators to modulate said sine and cosine waves to produce exponentially increasing sine and cosine waves, and
means coupled to said cathode ray tube for controlling the size of said halftone dots.

6. An electronic halftone generator in accordance with claim 5 wherein said exponential wave generator comprises an integrating circuit, and
means for periodically charging said integrating circuit.

7. An electronic halftone generator in accordance with claim 5 wherein said means for controlling said halftone dots comprises
a plurality of electronic image signals each having a pulse width corresponding to a tone on a portion of an original picture, and
means for applying said signals to unblank said imaging device for the duration of each pulse width and to blank said device at the end of each of said signals.

8. The combination in accordance with claim 2 that further includes
converting means coupled to said storage means for converting said plurality of binary coded signals into a corresponding plurality of image signals each having a characteristic dependent upon the binary value of said binary coded signals, and
means for applying said image signals to unblank said device for the duration of each image signal and to blank said device at the end of each of said image signals.

9. The combination in accordance with claim 2 that further includes
means coupled to said imaging device for positioning said halftone dots at any random location in said imaging device.

References Cited

UNITED STATES PATENTS

| | | | |
|---|---|---|---|
| 3,197,558 | 7/1965 | Ernst | 178—6.8 |
| 3,229,033 | 1/1966 | Artzt | 178—6 |
| 3,249,690 | 5/1966 | Schubert | 178—6.6 |

RICHARD MURRAY, Primary Examiner

ALFRED H. EDDLEMAN, Assistant Examiner

U.S. Cl. X.R.

178—6.7, 6.8